United States Patent
Bhagvath et al.

(10) Patent No.: US 10,630,536 B2
(45) Date of Patent: Apr. 21, 2020

(54) SOLUTION TO PROVIDE TUNNELING REDUNDANCY

(71) Applicant: HEWLETT PACKARD ENTERPRISE DEVELOPMENT LP, Houston, TX (US)

(72) Inventors: Mahasen Bhagvath, Karnataka (IN); Ankit Kumar Sinha, Karnataka (IN); G. Suma Chowdary, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/045,668

(22) Filed: Jul. 25, 2018

(65) Prior Publication Data
US 2020/0036577 A1 Jan. 30, 2020

(51) Int. Cl.
| | | |
|---|---|---|
| H04L 12/24 | (2006.01) | |
| H04L 12/46 | (2006.01) | |
| H04L 29/12 | (2006.01) | |
| H04L 12/703 | (2013.01) | |
| H04L 12/707 | (2013.01) | |
| H04L 12/713 | (2013.01) | |

(52) U.S. Cl.
CPC ...... *H04L 41/0668* (2013.01); *H04L 12/4633* (2013.01); *H04L 45/22* (2013.01); *H04L 45/28* (2013.01); *H04L 45/586* (2013.01); *H04L 61/2007* (2013.01)

(58) Field of Classification Search
CPC . H04L 12/4633; H04L 41/0668; H04L 45/22; H04L 45/28; H04L 45/568; H04L 61/2007

USPC .......................................................... 370/220
See application file for complete search history.

(56) References Cited

U.S. PATENT DOCUMENTS

| | | | |
|---|---|---|---|
| 7,269,135 B2 | 9/2007 | Frick et al. | |
| 9,049,106 B2 | 6/2015 | Regan et al. | |
| 9,191,271 B2 | 11/2015 | Pitchai et al. | |
| 9,755,958 B2 | 9/2017 | Mirsky et al. | |
| 2002/0186698 A1* | 12/2002 | Ceniza | H04L 12/4641 370/401 |
| 2004/0165581 A1* | 8/2004 | Oogushi | H04L 12/2856 370/352 |
| 2008/0181241 A1* | 7/2008 | Regan | H04L 45/02 370/401 |
| 2013/0201820 A1* | 8/2013 | Xiaoyong | H04L 41/06 370/220 |

(Continued)

OTHER PUBLICATIONS

Arunhasan, How to configure redundancy with Site-to-Site VPN tunnel, Apr. 7, 2015, 4 Pgs. http://community.arubanetworks.com/t5/tkb/articleprintpage/tkb-id/WiredNetworks/article-id/167.

(Continued)

*Primary Examiner* — Phong La
(74) *Attorney, Agent, or Firm* — Nolte Intellectual Property Law Group

(57) ABSTRACT

A system, method, and computer program for providing tunneling redundancy is provided. The method may include using router redundancy protocols on routers at endpoints of virtual IP tunnels to allow for failover of a master router to a backup router that assumes control over a virtual IP address in order to keep packet transmission in the virtual IP tunnel flowing with minimal interruption and no remote reconfiguration.

20 Claims, 4 Drawing Sheets

(56) References Cited

U.S. PATENT DOCUMENTS

| | | | | |
|---|---|---|---|---|
| 2013/0287037 | A1* | 10/2013 | Bush | H04L 43/10 370/401 |
| 2015/0117179 | A1* | 4/2015 | Sato | H04L 45/28 370/219 |
| 2016/0080249 | A1* | 3/2016 | Lu | H04L 45/28 370/219 |
| 2016/0149725 | A1* | 5/2016 | Yang | H04L 12/4633 370/218 |
| 2017/0005915 | A1* | 1/2017 | Mirsky | H04L 45/26 |
| 2017/0118067 | A1* | 4/2017 | Vedula | H04L 41/0668 |
| 2017/0155577 | A1* | 6/2017 | Zhang | H04L 12/4641 |
| 2017/0163476 | A1* | 6/2017 | Killadi | G06F 11/2005 |
| 2017/0359247 | A1* | 12/2017 | Dixon | H04L 45/04 |

OTHER PUBLICATIONS

Configuring GRE Tunnel Group, Aruba Networks, Retrieved on May 22, 2018, 2 Pgs. http://www.arubanetworks.com/techdocs/ArubaOS_63_Web_Help/Content/ArubaFrameStyles/Network_Parameters/Configuring_GRE_Tunnel_Group.htm.

Configuring Redundant Logical Tunnels, Juniper Networks, Retrieved on May 22, 2018, 2 Pgs. https://www.juniper.net/documentation/en_US/junos/topics/task/configuration/tunnel-redundant-configuring.html.

GRE Tunnel Interface States and What Impacts Them, Cisco, Dec 8, 2016, 7 Pgs. https://www.cisco.com/c/en/us/support/docs/ip/generic-routing-encapsulation-gre/118361-technote-gre-00.html#anc8.

Arunhasan, "How to configure a tunnel group for redundancy of GRE tunnels on Aruba Controller?", available online at <https://community.arubanetworks.com/t5/Controller-Based-WLANs/How-to-configure-a-tunnel-group-for-redundancy-of-GRE-tunnels-on/ta-p/234791>, Apr. 9, 2015, 5 pages.

Ose Cortes, "GRE tunnels Failover with SLA", available online at <https://supportforums.cisco.com/t5/wan-routing-and-switching/gre-tunnels-failover-with-sla/td-p/1746696>, Aug. 4, 2011, 8 pages.

* cited by examiner

SOLUTION TO PROVIDE TUNNELING REDUNDANCY

BACKGROUND

In data transmission technologies, a tunnel is a mechanism used to transmit foreign data, which is data in a different protocol than the network being traversed, across a network. Tunneling protocols allow use of, for example, Internet Protocol (IP) to encapsulate a foreign data protocol in the data or payload portion of IP packets. Most tunneling protocols operate at layer 4, and as such are implemented as a protocol that replaces transmission control protocol (TCP) or user datagram protocol (UDP). Tunnels are often used to connect remote networks, such as a headquarters office (HQ) to multiple branch offices, thus allowing for data sharing between each of the branch offices and the HQ. However, in this scenario IP tunnels present infrastructure challenges as each individual router in a branch office requires a dedicated IP tunnel to each individual router at the HQ location, thus resulting in multiple IP tunnels between a branch office and HQ. Since each IP tunnel between routers requires configuration, multiple IP tunnels inherently results in excessive use of valuable and expensive ternary content-addressable memory (TCAM) resources at each router. An additional challenge with IP tunnels in the HQ/branch office configuration is there is no redundancy in the event of a router failure, as the independent tunnels between routers are not associated in a way that allows for failover recovery.

BRIEF DESCRIPTION OF THE DRAWINGS

So that the manner in which the recited features, advantages and objects of the present disclosure may be understood in detail, a more particular description of the invention, briefly summarized above, may be had by reference to the examples thereof which are illustrated in the appended drawings. It is to be noted, however, that the appended drawings illustrate only typical examples of this invention and are therefore not to be considered limiting of its scope, for the invention may admit to other equally effective examples.

DETAILED DESCRIPTION

In the following, reference is made to examples of the inventive concept of this disclosure. However, it should be understood that the inventive concept is not limited to described examples. Instead, any combination of the following features, elements, or functionalities, whether related to different examples or not, is contemplated by the inventors as a possible combination that may be used to implement and practice an aspect of the present innovation. Furthermore, in various examples the innovation of this disclosure provides numerous advantages over the prior art, and although the examples of the present innovation may achieve advantages over other possible solutions and/or over the prior art, whether or not a particular advantage is achieved by a given example is also not intended to be limiting on the scope of the present disclosure. Therefore, the following aspects, features, functionalities, examples, and advantages are intended to be merely illustrative and are not considered elements or limitations of the appended claims, except where explicitly recited in a claim. Similarly, reference to "the invention" or "the innovation" are not to be construed as a generalization of any inventive subject matter disclosed herein and shall not be considered to be an element or limitation of the appended claims except where explicitly recited in a claim.

An IP tunnel is an Internet Protocol network communications channel between two remote networks that is used to transport a foreign network protocol by encapsulation of the foreign network's packets into packets of the tunnel's protocol. IP tunnels are often used for connecting two disjoint IP networks that don't have a native routing path to each other, via an underlying routable protocol across an intermediate transport network. IP Tunnels are also used to connect islands of IPv6 installations, for example, across the IPv4 Internet. In IP tunneling, every IP packet, including addressing information of its source and destination IP networks, is encapsulated within another packet format native to the transit network. At the borders between the source network and the transit network, as well as the transit network and the destination network, gateways are used that establish end-points of the IP tunnel across the transit network. Thus, the IP tunnel endpoints become native IP routers that establish a standard IP route between the source and destination networks.

Figure 1:
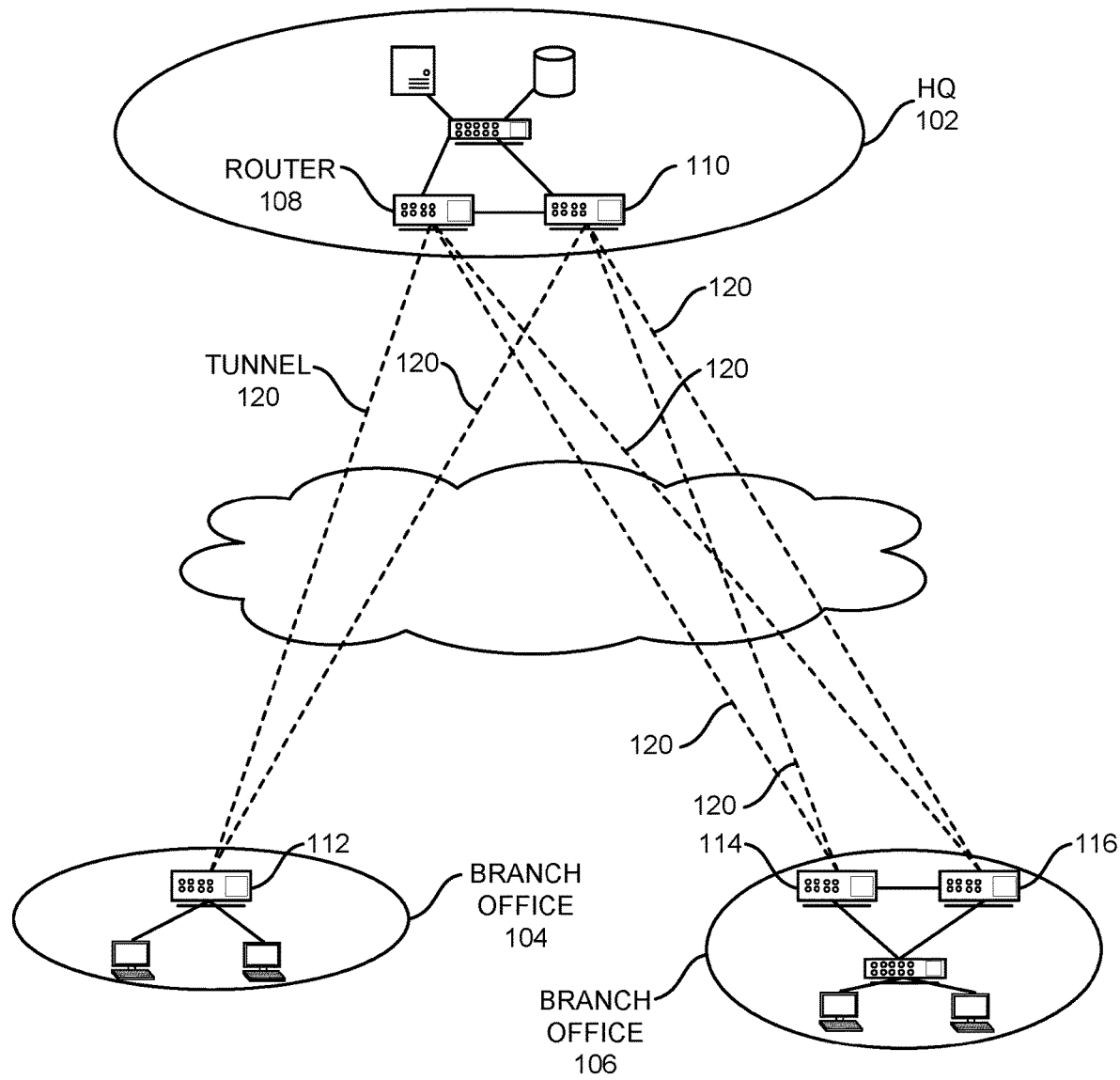
FIG. 1 illustrates an example IP tunnel configuration.

The challenge with this configuration of IP tunnels is that the border routers or tunnel endpoints at the source and destination networks responsible for tunneling traffic don't have redundancy as a result of the multiple independently configured tunnels between independently configured routers. Therefore, if one of the routers in the group fails, the group generally relies on time consuming keep alive messages to identify the failure, which requires significant time to execute and results in packet/data losses. FIG. 1 illustrates an example IP tunnel configuration between a primary office or headquarters (HQ) 102 and a first branch office 104 and a second branch office 106. The HQ 102 has a First and Second Routers 108, 110 in communication with each other and, for example, switches, databases, application servers, etc. on the local network in the HQ 100. The first branch office 104 may include Router A 112 in communication with one or more user stations on the first branch office's network. A second branch office 106 may include Router B 114 and Router C 116, which are in communication with each other and, for example, switches, databases, application servers, etc. on the local network in second branch office 106.

As noted above, the challenge with IP tunneling in this configuration is that each individual router requires a dedicated IP tunnel to each individual router it is communicating with. Therefore, for example, the First and Second Routers 108, 110 each have a dedicated IP tunnel 120 in direct communication with Router A 112 in the first branch office 104. Similarly, the First and Second Routers 108, 110 each have a dedicated IP tunnel 120 in direct communication with Router B 114 and Router C 116 in the second branch office 106. Therefore, six independent IP tunnels 120 are required to connect five routers (108, 110, 112, 114, & 116). Further, each router at a tunnel endpoint is required to store the tunnel configuration information in the TCAM, which results in excessive usage of valuable TCAM resources. For example, both the First and Second Routers 108, 110 at the HQ location 102 would be required to store IP tunnel configuration information for three independent IP tunnels 120 in their respective TCAM.

Router redundancy is also problematic in this configuration, as if any of the routers in the configuration fail, there is no mechanism in IP tunneling protocol for other routers in the configuration, including the router at the other end of a dedicated IP tunnel 120, to learn of the failure or failover to another router. As such, once a router failure is detected, the IP tunnel configurations must be manually reset to re-enable communication between the respective IP tunnel 120 endpoint routers. For example, if Router A 112 goes down, there is no way first branch office 104 can connect to HQ 102 as there is no redundant router or failover router in communication with HQ 102. As such, once the router failure is discovered, the remedy is to reset and reconfigure Router A 112 to communicate with First Router 108 in HQ 102 through IP tunnel 120. Similarly, if First Router 108 goes down, there is no mechanism in IP tunneling protocol to inform Router A 112 of the failure and First Router 108 must be manually reset or reconfigured to continue communication with Router A 112 or Router A 112 can be manually reconfigured to tunnel to Router 110.

The present disclosure provides a solution to IP tunneling router redundancy and TCAM resource usage. In an example of the present disclosure, a solution to IP tunneling router redundancy and resource usage is provided by using virtual router protocols. More particularly, each of routers 108, 110, 112, 114, and 116 may implement a virtual router protocol to provide a single dedicated IP tunnel between the network location endpoints, such as the HQ 102, first branch office 104, and second branch office 106. Thus, the tunnel endpoints in each location 102, 104, 106 become a failover group of routers using a virtual router protocol, such as virtual router redundancy protocol (VRRP), for example. VRRP is a computer networking protocol with automatic assignment of available routers to participating hosts, which increases the availability and reliability of routing paths via automatic default gateway selections. VRRP operates through creation of virtual routers, which are an abstract representation of multiple routers, i.e. a master router that handles packet traffic and one or more backup routers capable of taking over as the master router upon a master router failure. The master and backup routers operate essentially as a router group. When using VRRP the default gateway of a participating host is assigned to the virtual router instead of a physical router, therefore, if the physical router that is routing packets on behalf of the virtual router fails, another physical router is automatically selected to replace it and simply takes over the default gateway traffic. The physical router that is forwarding packets at any given time is referred to as the master router and other routers at the network location are designated as backup routers. Essentially VRRP provides information on the state or status of a router, not the routes processed and exchanged by that router. Further, each VRRP router is generally associated with a single subnet, as each VRRP router does not advertise IP routes beyond that subnet or affect the routing table. VRRP can be used in Ethernet, MPLS and token ring networks with Internet Protocol Version 4 or version 6.

In an example of the present disclosure Multi Chassis LAG solutions (MC LAG) may be used. MC LAG is a type of link aggregation group (LAG) with constituent ports that terminate on separate chassis, primarily for the purpose of providing redundancy in the event one of the chassis fails. MC-LAG adds node-level redundancy to the normal link-level redundancy that a LAG provides. This allows two or more nodes to share a common LAG endpoint. The multiple nodes present a single logical LAG to the remote end. Nodes in an MC-LAG cluster communicate to synchronize and negotiate automatic switchovers (failover). Some implementations may support administrator-initiated (manual) switchovers An example of the present disclosure uses VRRP to provide tunneling redundancy on both ends of the network locations shown in FIG. 1, I.e, the tunnel endpoints in each of the HQ 102 and branch offices 104, 106 would be a group of routers made redundant using VRRP. VRRP is a protocol used to provide redundancy to access switches in downlink side, however, in this example VRRP is used in a new configuration to provide redundancy in the uplink side. Tunnels on both ends of the network are configured using VRRP Virtual IP as source and destination IP. The tunnel with same source and destination IP will be configured on all VRRP enabled border routers, however, the tunnel will be active only on the VRRP master so if the master goes down, VRRP notifies one of the backup routers to become the master router. With this notification, backup makes the tunnel configured on it active and packet transmission through the tunnel continues without any manual reset or configuration required. Further, in the present example since the tunnels are configured using Virtual IP, only one tunnel is configured on all border routers with same source and destination IP, which results in a substantial reduction in TCAM resources used on the routers and provides a sub second failover to a backup router upon failure of a master router, thus keeping the tunnel active and transmitting packets.

Figure 2:
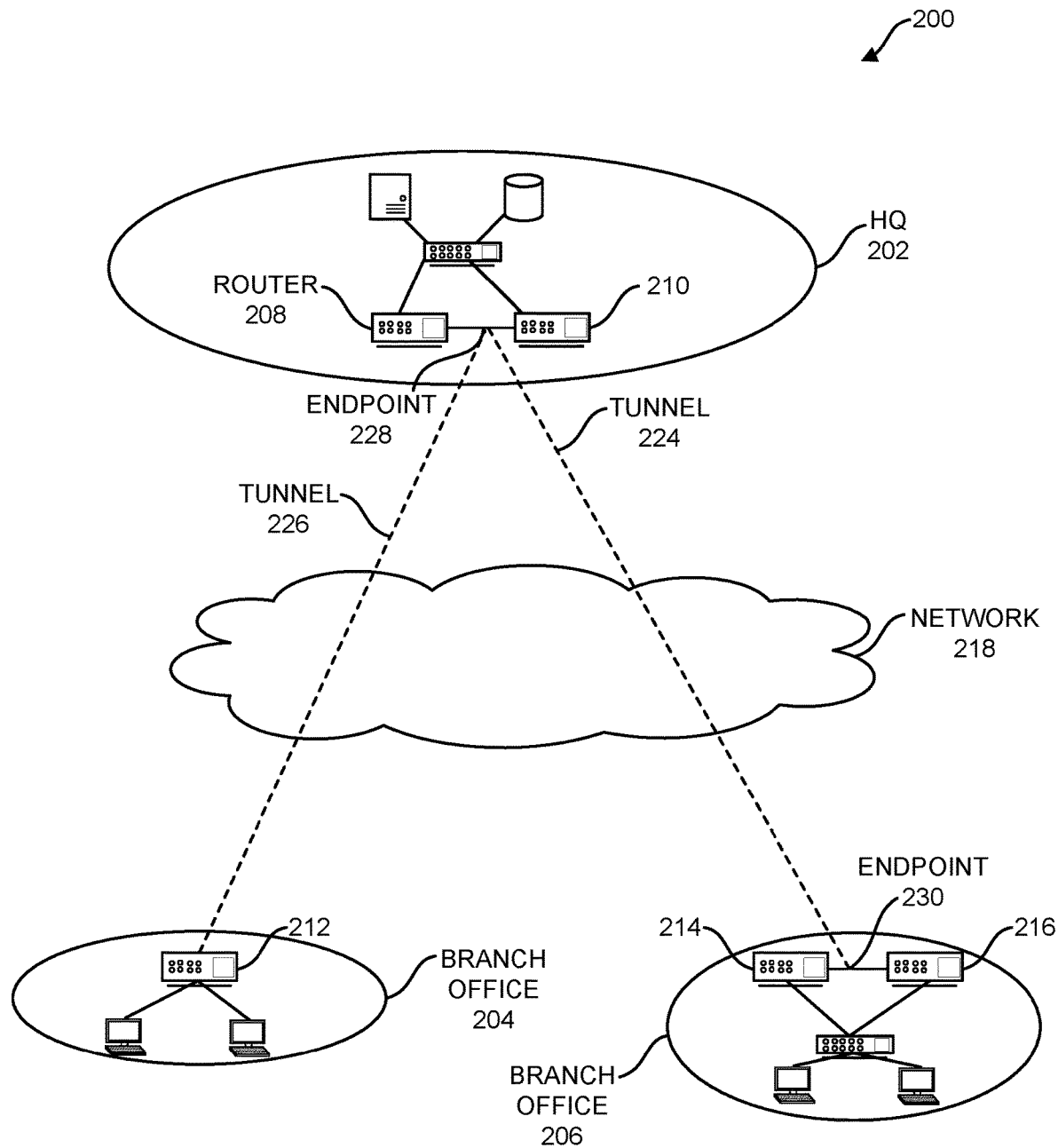
FIG. 2 illustrates an example virtual router IP tunnel configuration.

FIG. 2 illustrates an example virtual router IP tunnel redundancy configuration 200 that provides router failover redundancy and minimizes TCAM resource usage. The example configuration 200 includes a primary office or headquarters 202, a first branch office 204, and a second branch office 206. Although only two branch offices are shown in the example figure, any number of branch offices may be implemented using the example configuration. In the current example, the HQ 202 includes a First Router 208 and a Second Router 210 in communication with each other and, for example, other components such as switches, databases, application servers, etc. on the local network in the HQ 202. The first branch office 204 may include Router A 212 in communication with one or more user stations on the first branch office's network. A second branch office 206 may include Router B 214 and Router C 216, which are in communication with each other and, for example, switches, databases, application servers, etc. on the local network in second branch office 206. The first branch office 204 is in communication with HQ 202 through a first virtual router tunnel 226 that connects a headquarters tunnel virtual endpoint 228 to Router A in the first branch office 204. The second branch office 206 is in communication with HQ 202 through a second virtual router tunnel 224 that connects a headquarters tunnel virtual endpoint 228 to a second branch office tunnel virtual endpoint 230 in the second branch office 206. The tunnel endpoints 228, 230 may, for example, represent data communication lines and associated devices that are in communication with multiple routers at the respective endpoint office locations. The virtual router tunnels 224, 226 may traverse through a plurality of other networks, such as a public network 218, which may be the Internet. In the example IP tunnel redundancy configuration 200, the three locations (HQ 202, first branch office 204, and second branch office 206) are connected using only two virtual router tunnels 224, 226, where the prior configuration using IP tunnels required six independent tunnels to interconnect the three locations. As such, the TCAM resource usage is reduced by 60%.

Further, the example IP tunnel redundancy configuration 200 provides a failover protocol for the routers in the configuration that redirects packet traffic to a backup router in the event that the primary or master router currently managing packet flow at any of the locations with two or more routers fails. At locations where there is only one router, such as first branch office 204, there is no secondary or back up router to failover to, so the primary (and only) router will have to be reset or reconfigured. The failover router redundancy is accomplished by using virtual router tunnels 224, 226, which may be for example, configured as VRRP tunnels. With the virtual router tunnels 224, 226 the tunnel endpoints or locations are assigned a virtual address, and the primary router at the endpoint or location receives all packets addressed to the virtual address. The virtual address is generally different from the addresses of the primary and secondary or backup routers, and as such, when the primary router fails, the secondary or backup router assumes the primary router role and begins processing packets addressed to the virtual router address. The handoff of the primary router designation is executed without manual intervention through, for example, software control algorithms embedded in the protocol management software.

In one example of how the protocol management software may operate to autonomously transfer the primary router designation upon a failure of the primary router, the primary router may be polled for status at predetermined intervals. If the status of the primary router changes, thus indicating a problem or failure in the primary router's capabilities to process packets, then the protocol management software activates the secondary or backup router as the new primary router to process packets. The former primary router may be disabled or designated as a secondary or backup router, depending upon its ability to function after, for example, diagnostics are executed to remedy the router's ability to process packet flow or essentially to correct the status indicator that caused the failover to the secondary or backup router.

Figure 3:
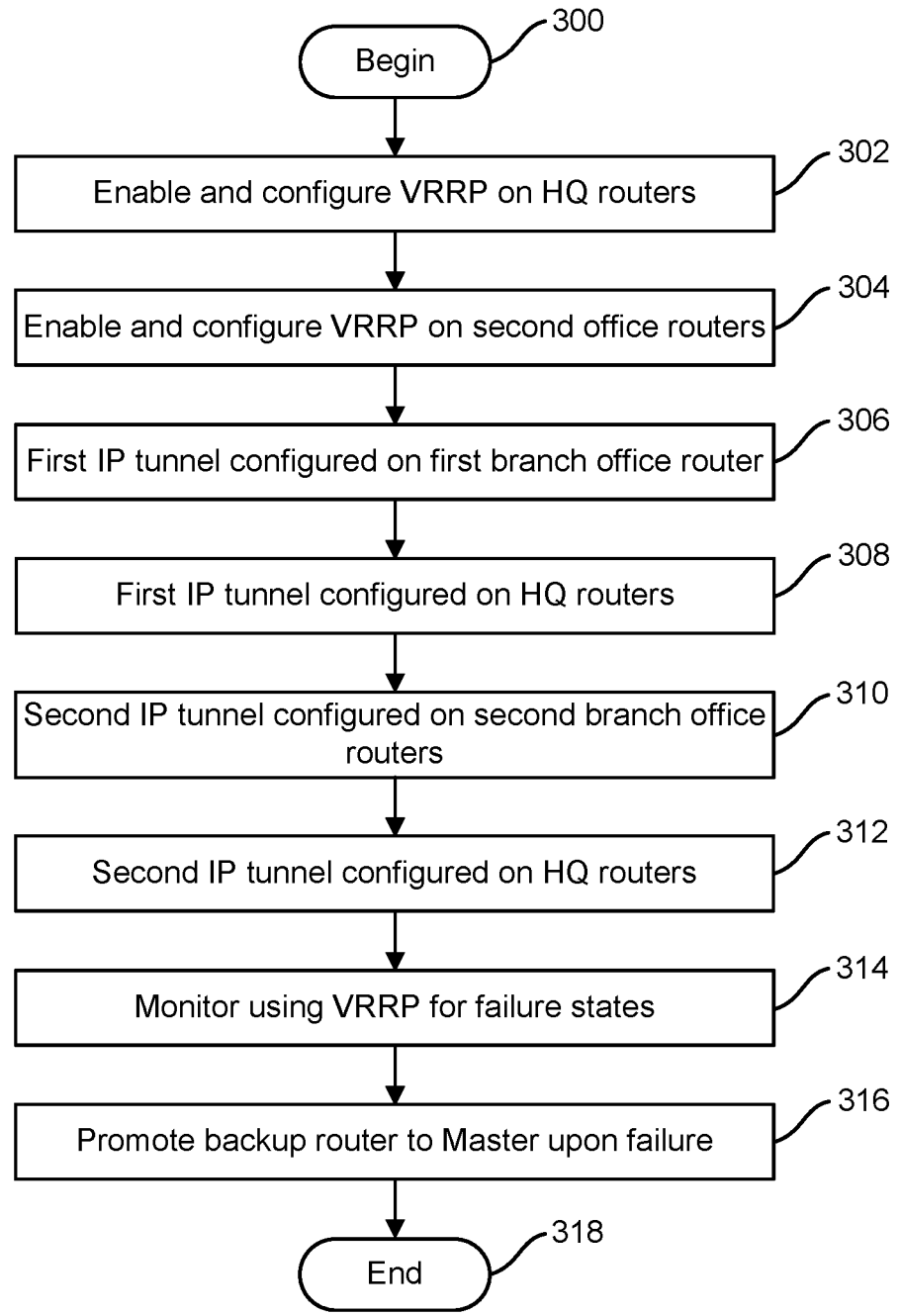
FIG. 3 illustrates an example method of implementing an example virtual router ip tunnel configuration.

FIG. 3 illustrates an example method of implementing a virtual router ip tunnel configuration, such as the tunnel configuration shown in FIG. 2. The example method begins at 300 and continues to 302 where VRRP is enabled and configured on Routers 208, 210 at the HQ 202. The method continues to 304 where VRRP is enabled and configured on Routers 214 and 216 in the second branch office 206. At 306 an IP tunnel is configured on Router A 212 in the first branch office 204 with source IP as its own physical IP address and destination IP as the virtual IP address of VRRP at the HQ location 202 that was set up in 302. At 308 the HQ routers 208, 210 are configured with the physical IP address of router 212 as the destination address and their virtual address as source address for virtual tunnel 226. Once router 212 is configured to communicate with the virtual address of the routers at HQ 202 and the HQ routers 208, 210 are configured with the physical address of the router 212 in the first branch office, then the virtual tunnel 226 is set up and enabled for packet transmission.

The method continues to 310 where the second virtual tunnel 224 is configured on VRRP enabled routers 214, 216 at the second branch office 206 with the source IP as a virtual IP of the VRRP endpoint configured in the second branch office 206 at step 304 and the destination IP as the virtual IP address of the VRRP routers 208, 210 at the HQ location 202 that was set up in 302. In 310 the method is essentially initializing the second virtual tunnel 224 between the second branch office 206 and the HQ 202 by configuring the routers 214 and 216 in the second branch office 206 for the virtual tunnel 224. At 312 the example method configures the second virtual tunnel 224 on each VRRP enabled routers 208, 210 in HQ 202 with a source IP as the virtual IP of VRRP assigned to HQ 202 and a destination IP as virtual IP of the VRRP routers 214, 216 in the second branch office 206 set up in 304. Therefore, in 312 the method is essentially initializing the second virtual tunnel 224 between the HQ 202 and the second branch office 206 by configuring the routers 208, 210 at HQ 202 for the second virtual tunnel 224. Once both the terminating endpoints 228, 230 routers are configured in steps 310 and 312, then the second virtual tunnel 224 is set up and ready to transmit and receive packets. Once both virtual tunnels 224, 226 are active, the method continues to 314 where the state of each router in the configuration (at the tunnel endpoints) is monitored for failure, and upon a detected failure state, the appropriate backup router is promoted to the master router and assumes control of the virtual tunnel to continue transmitting and receiving packets, as noted at 316 in the example method, and the example method ends at 318.

Virtual tunnel 226 illustrates an example where there is router redundancy at the HQ location 202, but not at the first office location 204, as the first office 204 has only a single router 212, thus redundancy is not possible at the first office location 204. Virtual tunnel 224 illustrates an example with router redundancy at both terminating ends 228, 230 of the virtual tunnel 224, as both terminating end locations 228, 230 have multiple routers to support failover capability. Therefore, if the master router 214, for example, goes down in the second branch office 206, then the backup router 216 automatically receives VRRP notification promoting router 216 to the master router. This immediately re-enables the second virtual tunnel 224 on the new master router 216 without requiring manual intervention. Similarly, if the master router at the HQ location 202, which may be First Router 208, for example, goes down, then the backup router, which may be Second Router 210, immediately becomes the master router per VRRP notification and the new master router 210 activates the virtual tunnel 224 thereon and continues transmitting and receiving packets. Therefore, with the current router redundancy, even if a tunnel endpoint router goes down, there is a sub-second failover and the same tunnel becomes active again using the backup router under VRRP and no manual intervention is required.

The example configuration and method shown in FIGS. 2 and 3 provides several advantages over other IP tunneling arrangements, such as the one shown in FIG. 1. For example, TCAM/Tunnel resources aren't wasted with multiple IP tunnel configurations that each require memory to configure and implement. Additionally, the example method and configuration provide tunnel endpoint redundancy without requiring manual intervention when a tunnel endpoint goes down. Further, the example configuration and method may be used with multi chassis LAG solutions along with VRRP. Further still, the example configuration and method can be used with IPsec for secure VPN connectivity and bidirectional forwarding detection, dead peer detection and other VPN monitoring solutions aren't required when the example configuration or method is used.

Returning to the example method described in FIG. 3, when Router A 212 is configured to communicate with HQ 202 through the virtual router tunnel 226, the following example configuration commands may be executed to configure Router A 212:

```
gre-routed-tunnel enable vlan-id 100
interface tunnel 1
  tunnel mode gre
  tunnel key 10
  tunnel source 192.168.2.1
  tunnel dest 192.168.1.1
  exit
```

The configuration of Router A 212 does not require VRRP commands, as Router A is a standalone router at IP address 192.168.2.1, for example, and as such there is no back up or failover router to set up VRRP for redundancy. From the perspective of Router A 212, the first virtual tunnel 226 looks like a standard IP GRE tunnel with fixed source and destination IP addresses. Setting up the routers 208, 210 in the HQ to support the first virtual tunnel 226 between the HQ 202 and the first branch office 204 requires configuring the routers for VRRP, which may be accomplished by the example commands shown below. The following example commands may be used to configure First Router 208 in the HQ 202 for VRRP operation:

```
ip routing
router vrrp
  ipv4 enable
  exit
vlan 1
  name "DEFAULT_VLAN"
  untagged 1-26
  ip address 192.168.1.2 255.255.255.0
  vrrp vrid 10
    virtual-ip-address 192.168.1.1
    enable
    exit
  exit
gre-routed-tunnel enable vlan-id 1
interface tunnel 1
  tunnel mode gre
  tunnel key 10
  tunnel source vrrp 192.168.1.1
  tunnel dest 192.168.2.1
  exit
```

Similarly, the following example commands may be used to configure Second Router 210 in the HQ 202 for VRRP operation:

```
ip routing
router vrrp
  ipv4 enable
  exit
vlan 1
  name "DEFAULT_VLAN"
  untagged 1-26
  ip address 192.168.1.3 255.255.255.0
  vrrp vrid 10
    virtual-ip-address 192.168.1.1
    enable
    exit
  exit
gre-routed-tunnel enable vlan-id 1
interface tunnel 1
  tunnel mode gre
  tunnel key 10
  tunnel source vrrp 192.168.1.1
  tunnel dest 192.168.2.1
  exit
```

The configuration and setup for Routers 208, 210 sets up the source IP address for the HQ routers 208, 210 as a VRRP (virtual) address of 192.168.1.1. Once the router addresses are configured, the router states (master and backup) must also be configured before the virtual tunnel 226 can be activated. Example commands to display the state of the VRRP and tunnels on VRRP backup and master are shown below:

| [[ROUTER 208]] | [[ROUTER 210]] |
|---|---|
| VRRP Global Statistics Information | VRRP Global Statistics Information |
| VRRP Enabled: Yes | VRRP Enabled: Yes |
| Vlan ID: 1 | Vlan ID: 1 |
| Virtual Router ID: 10 | Virtual Router ID: 10 |
| Protocol Version: 2 | Protocol Version: 2 |
| State: Master | State: Backup |
| Up Time: 42 secs | Up Time: 66 secs |
| Virtual MAC Address: | Virtual MAC Address: |
| 00005e-00010a | 00005e-00010a |
| Master's IP Address: 192.168.1.1 | Master's IP Address: 192.168.1.1 |
| R1# show interfaces tunnel | R2# show interfaces tunnel |
| Tunnel Configuration: | Tunnel Configuration: |
| Tunnel: 251658892 | Tunnel: NULL |
| Tunnel Name: GRE_Tunnel01 | Tunnel Name: GRE_Tunnel01 |
| Tunnel Status: Enabled | Tunnel Status: Disabled |
| Source Address: 192.168.1.1 | Source Address: 192.168.1.1 |
| Destination Address: 192.168.2.1 | Destination Address: 192.168.2.1 |
| Mode: GRE | Mode: GRE |
| TOS: −1 | TOS: −1 |
| TTL: 64 | TTL: 64 |
| IPv6: n/a | IPv6: n/a |
| MTU: 1280 | MTU: 1280 |

Once the routers are active, the IP tunnel redundancy configuration 200 transmits packets across virtual tunnel 226. Similar configurations and commands may be used to set up data traffic through virtual tunnels to and from the branch offices 204, 206 and the HQ 202. If any one of the primary or master routers at one of the tunnel endpoints 228, 230 fails and causes one of the virtual router tunnels 224, 226 to stop packet flow, then the VRRP protocol will automatically failover to a secondary or backup router to return the virtual tunnel 224, 226 to an active state. For example, if the First Router 208 in the HQ goes down, then virtual router tunnels 224, 226 will not be able to transmit or receive packets through the endpoint 228 at the HQ 202. When First Router 208 fails, the VRRP protocol sees a state of the master router (First Router 208) change and immediately determines a router failure and begins to transition control of the virtual tunnels 224, 226 to a secondary router (Second Router 210) by promoting the secondary router (Second Router 210) to a primary or master router that is in control over packet flow to/from the tunnels 224, 226 thus making the tunnels 224, 226 active again. Further, if the failed router (First Router 208) comes back online or otherwise returns to an active state, then the First Router 208 is designated as a backup router by VRRP and is ready to become the master router in the event that the current master router encounters a failure or change of VRRP state.

When Second Router 210 becomes the master router, the following configurations are used in the respective routers 208, 210:

| [[ROUTER 208]] | [[ROUTER 210]] |
|---|---|
| R1# show vrrp | R2# show vrrp |
| VRRP Global Statistics Information | VRRP Global Statistics Information |
| VRRP Enabled: Yes | VRRP Enabled: Yes |
| Vlan ID: 1 | Vlan ID: 1 |
| Virtual Router ID: 10 | Virtual Router ID: 10 |
| Protocol Version: 2 | Protocol Version: 2 |
| State: Backup | State: Master |
| Up Time: 66 secs | Up Time: 66 secs |

-continued

| [[ROUTER 208]] | [[ROUTER 210]] |
|---|---|
| Virtual MAC Address:<br>00005e-00010a<br>Master's IP Address: 192.168.1.1<br>R1# show interfaces tunnel<br>Tunnel Configuration:<br>Tunnel: NULL<br>Tunnel Name: GRE_Tunnel01<br>Tunnel Status: Disabled<br>Source Address: 192.168.1.1<br>Destination Address: 192.168.2.1<br>Mode: GRE<br>TOS: −1<br>TTL: 64<br>IPv6: n/a<br>MTU: 1280 | Virtual MAC Address:<br>00005e-00010a<br>Master's IP Address: 192.168.1.1<br>R2# show interfaces tunnel<br>Tunnel Configuration:<br>Tunnel: NULL<br>Tunnel Name: GRE_Tunnel01<br>Tunnel Status: Enabled<br>Source Address: 192.168.1.1<br>Destination Address: 192.168.2.1<br>Mode: GRE<br>TOS: −1<br>TTL: 64<br>IPv6: n/a<br>MTU: 1280 |

The above noted configurations for Routers 208, 210 illustrate the configuration changes that happen in VRRP and tunnels upon a failure. For example, upon a failure of First Router 208 when this router is acting as the master, then the Second Router 210 is promoted to the master router state. This happens by VRRP automatically reconfiguring the virtual routers using the above noted configuration files. For example, the "state" of First Router 208 is changed to "Backup" and the "state" of the Second Router 210 is changed to "Master." Further, in this example the "Tunnel Index" for the First Router 208 is changed to "251658892" to represent the change in control over the virtual tunnels 224, 226. The Tunnel Index of First Router which goes down will be zero and the Tunnel Index of Second Router will be non-zero after failover. Similarly, the "Tunnel Status" value for the Second Router 210 is changed to "Enabled" to illustrate that the Second Router 210 is now the master router in control over packet flow through the HQ 202 endpoint 228 and the "Tunnel Status" of the First Router 208 is changed to "Disabled" to illustrate that the First Router 208 is no longer in control over any packet flow and is now the backup router in the VRRP configuration.

Figure 4:
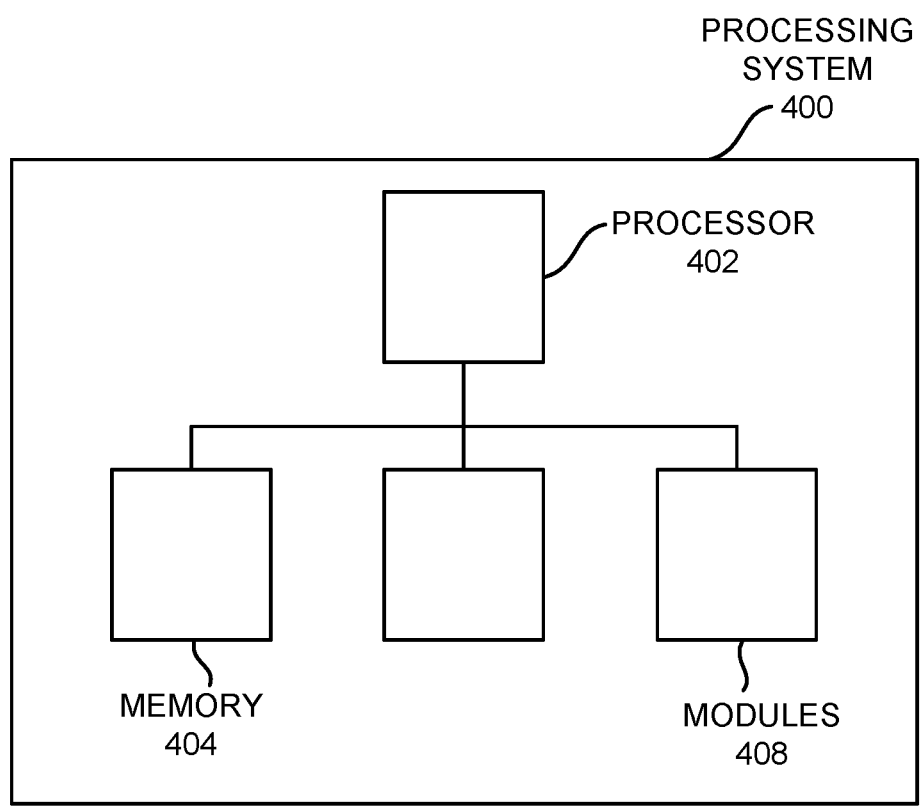
FIG. 4 illustrates an example computer or processing system used to implement example methods or systems of the disclosure.

FIG. 4 illustrates an example computer or processing system 400 used to implement example methods or systems of the disclosure. The processing system 400 may include a processor 402 or other type of device or module capable or reading and executing software instructions. The processor 402 is in communication with a memory 404, which may be used to store the software instructions to be executed by the processor 402. The computer system 400 may also include an interface or I/O device configured to receive and send data or commands from the processing system 400. The processing system 400 may include other computer related modules or components at location 408 and in the examples described herein the processing system 400 may reside locally on one or more of the routers or remotely on a control or master server, for example, in the cloud. Regardless of the location of the processing system 400, system 400 is in communication with each of the routers to provide configuration and control functions thereto.

In the preceding, reference is made to examples presented in this disclosure. However, the scope of the present disclosure is not limited to specific described examples. Instead, any combination of the following features and elements, whether related to different examples or not, is contemplated to implement and practice contemplated examples. Furthermore, although examples disclosed herein may achieve advantages over other possible solutions or over the prior art, whether or not a particular advantage is achieved by a given example is not limiting of the scope of the present disclosure. Thus, the preceding aspects, features, examples and advantages are merely illustrative and are not considered elements or limitations of the appended claims except where explicitly recited in a claim(s).

Examples presented in this disclosure may be embodied as a system, method or computer program product. Accordingly, aspects disclosed herein may take the form of an entirely new hardware example, an entirely new software example (including firmware, resident software, microcode, etc.) or an example combining software and hardware aspects that may all generally be referred to herein as a device, component, circuit, module, or system. Furthermore, aspects disclosed herein may take the form of a computer program product embodied in one or more non-transitory computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Computer program code for carrying out operations for examples disclosed herein may be written in any combination of one or more programming languages, including an object-oriented programming language such as Java, Smalltalk, C++ or the like and conventional procedural programming languages, such as the "C" programming language or similar programming languages.

Examples presented in this disclosure are described above with reference to flowchart illustrations or block diagrams of methods, apparatus (systems) and computer program products according to examples disclosed herein. It will be understood that each block of the flowchart illustrations or block diagrams, and combinations of blocks in the flowchart illustrations or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

While the foregoing is directed to examples presented in this disclosure, other and further examples or variations may be devised without departing from the basic scope of contemplated examples, and the scope thereof is determined by the claims that follow.

What is claimed is:

1. A method for facilitating router redundancy, comprising:
   enabling a router redundancy protocol on a first router in conjunction with a second router, wherein the first and second routers are configured as a backup router and a master router, respectively;
   configuring a virtual Internet Protocol (IP) tunnel between a first virtual IP tunnel endpoint corresponding to the first and second routers and a second virtual IP tunnel endpoint corresponding to a set of remote routers, wherein the virtual IP tunnel facilitates packet transmission capability between the first and second virtual IP tunnel endpoints based on a layer-3 tunneling protocol;

monitoring the second router for failure; and
upon detecting a failure of the second router, promoting the first router to a master router based on the router redundancy protocol for packet transmission via the virtual IP tunnel.

2. The method of claim 1, wherein the router redundancy protocol includes Virtual Router Redundancy Protocol (VRRP).

3. The method of claim 2, wherein the router redundancy protocol further includes IP security (IPSec).

4. The method of claim 1, wherein the first and second routers operate based on Multi Chassis link aggregation group (LAG).

5. The method of claim 1, wherein configuring the virtual IP tunnel comprises setting a first virtual IP address for the first virtual IP tunnel endpoint and a second virtual IP address for the second virtual IP tunnel endpoint.

6. The method of claim 5, wherein configuring the virtual IP tunnel further comprises configuring the first virtual IP address on the first and second routers.

7. The method of claim 5, wherein the master router transmits and receives packets for the first virtual IP tunnel endpoint based on the first virtual IP address.

8. The method of claim 1, wherein the first and second routers are configured to operate as a single router using a virtual router identifier distinct from an IP address of the virtual IP tunnel.

9. The method of claim 1, wherein promoting the first router to the master router further comprises changing a tunnel index value of the virtual IP tunnel at the first router.

10. A non-transitory computer readable medium comprising computer executable instructions stored thereon, that when executed by a processor, cause the processor to perform a method for facilitating router redundancy, comprising:
enabling router redundancy protocol on a first router in conjunction with a second router, wherein the first and second routers are configured as a backup router and a master router, respectively;
configuring a virtual Internet Protocol (IP) tunnel between a first virtual IP tunnel endpoint corresponding to the first and second routers and a second virtual IP tunnel endpoint corresponding to a set of remote routers, wherein the virtual IP tunnel facilitates packet transmission capability between the first and second endpoints based on a layer-3 tunneling protocol;
monitoring the second router for failure; and
upon detecting a failure of the second router, promoting the first router to a master router based on the router redundancy protocol for packet transmission via the virtual IP tunnel.

11. The non-transitory computer readable medium of claim 10, wherein configuring the virtual IP tunnel comprises setting a first virtual IP address for the first virtual IP tunnel endpoint and a second virtual IP address for the second virtual IP tunnel endpoint.

12. The non-transitory computer readable medium of claim 11, wherein the master router transmits and receives packets for the first virtual IP tunnel endpoint based on the first virtual IP address.

13. The non-transitory computer readable medium of claim 10, wherein the first and second routers are configured to operate as a single router using a virtual router identifier distinct from an IP address of the virtual IP tunnel.

14. The non-transitory computer readable medium of claim 10, wherein the router redundancy protocol includes one or more of: Virtual Router Redundancy Protocol (VRRP) and IP security (IPSec).

15. The non-transitory computer readable medium of claim 10, wherein promoting the first router to the master router further comprises changing a tunnel index value of the virtual IP tunnel at the first router.

16. A computer system, comprising:
a processor in communication with a data storage element; and
a memory in communication with the processor, the memory storing instructions that when executed by the processor cause the processor to perform a method, the method comprising:
enabling a router redundancy protocol on the computer system in conjunction with a second computer system, wherein the computer system and the second computer system are configured as a backup router and a master router, respectively;
configuring a virtual Internet Protocol (IP) tunnel between a first virtual IP tunnel endpoint corresponding to the computer system and the second computer system and a second virtual IP tunnel endpoint corresponding a set of remote computer systems, wherein the virtual IP tunnel facilitates packet transmission capability between the first and second virtual IP tunnel endpoints based on a layer-3 tunneling protocol;
monitoring the second computer system for failure; and
upon detecting a failure of the second computer system, promoting the computer system to a master router based on the router redundancy protocol for packet transmission via the virtual IP tunnel.

17. The computer system of claim 16, wherein the router redundancy protocol includes one or more of: Virtual Router Redundancy Protocol (VRRP) and IP security (IPSec).

18. The computer system of claim 16, wherein configuring the virtual IP tunnel comprises setting a first virtual IP address for the first virtual IP tunnel endpoint and a second virtual IP address for the second virtual IP tunnel endpoint.

19. The computer system of claim 16, wherein promoting the computer system to the master router further comprises changing a tunnel index value of the virtual IP tunnel at the computer system.

20. The computer system of claim 16, wherein the computer system and the second computer system are configured to operate as a single router using a virtual router identifier distinct from an IP address of the virtual IP tunnel.

* * * * *